(12) United States Patent
Neal

(10) Patent No.: US 10,508,751 B2
(45) Date of Patent: Dec. 17, 2019

(54) PILOT VALVE

(71) Applicant: Nelson Irrigation Corporation, Walla Walla, WA (US)

(72) Inventor: Meade M. Neal, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 0 days.

(21) Appl. No.: 15/944,361

(22) Filed: Apr. 3, 2018

(65) Prior Publication Data
US 2019/0301633 A1 Oct. 3, 2019

(51) Int. Cl.
*F16K 31/40* (2006.01)
*A01G 25/16* (2006.01)

(52) U.S. Cl.
CPC .......... *F16K 31/402* (2013.01); *A01G 25/16* (2013.01)

(58) Field of Classification Search
CPC .. F16K 31/402; F16K 31/40; F16K 31/52491; F16K 31/524; A01G 25/16
USPC ............... 251/251, 286, 287, 288, 255, 252
See application file for complete search history.

(56) References Cited

U.S. PATENT DOCUMENTS

| | | | | | |
|---|---|---|---|---|---|
| 4,203,431 | A | * | 5/1980 | Abura | A61H 7/005 15/28 |
| 4,507,634 | A | * | 3/1985 | Vanderlaan | H02K 26/00 310/36 |
| 4,616,803 | A | * | 10/1986 | Schils | F16H 1/16 251/14 |
| 5,144,702 | A | * | 9/1992 | Haraga | A61H 33/02 4/541.2 |
| 6,394,412 | B2 | | 5/2002 | Zakai et al. | |

* cited by examiner

*Primary Examiner* — Craig J Price
*Assistant Examiner* — Andrew J Rost
(74) *Attorney, Agent, or Firm* — Nixon & Vanderhye P.C.

(57) ABSTRACT

A pilot valve includes a housing, a motor secured in the housing and including a rotating output shaft, and a rocker disposed in the housing and coupled with the motor via a cam mechanism. The rocker is pivotable between a CLOSED position and an OPEN position by operation of the motor. The rocker includes a left-side boss and a right-side boss that are positioned in a path of the cam mechanism, where the left- and right-side bosses serve as cam stops in the CLOSED and OPEN positions, respectively. The housing may include features to better secure the motor, and the assembly may be configured to prevent unintended changes of state during periods of nonuse.

19 Claims, 6 Drawing Sheets

PILOT VALVE

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to an electrical valve used to control flow through a hydraulic supply line and, more particularly, to an actuator for an electrically-controlled hydraulic diaphragm valve.

It is desirable to operate valves in some irrigation systems automatically. The automatic operation requires a pilot device to open and close a port to the valve control chamber to allow water to enter and leave the control chamber. This can be done with a three-way solenoid valve or motorized valve. In one version, an electro-mechanical mechanism moves a piece that can open a port that allows water to enter the control chamber of the valve and then close the port to allow water to leave the control chamber.

With reference to FIG. 1, when the motor is energized, a pinion gear (not shown) on the motor shaft spins and rotates a ring gear. A cam guide on the ring gear guides the pin on the cam, thus rotating the cam. The cam pushes on the side of a rocker, which results in downward movement of the pin. The pin then presses down on a diaphragm, squeezing it against the port and sealing off the flow of water. When the motor is energized in the opposite direction, the mechanism reverses, and the other port is sealed. This allows water to enter from the previously sealed port.

A valve of this type is described in U.S. Pat. No. 6,394,412, the contents of which are hereby incorporated by reference.

In use, existing motorized valves are lacking robustness and are prone to failure if dropped or operated beyond 30,000 cycles. When the structure fails, the motor shifts and the gear train no longer functions properly. Thus, the existing valves fail to seal off the ports, and fluid leaks past the seals. The internal structure can also fail when the existing valves are dropped. Additionally, existing motorized valves are rated for 150 psig operating pressure, while many applications require 175 psig operating pressure. Still further, when the existing motorized valves have been left non-operating for a period of time, for example over winter, the valve can end up in an in-between state, where it is neither open nor closed. This requires a cycling of the valve prior to the start of irrigation to set it in the correct state. Existing motorized valves also lack provisions to protect the wires that connect the valve with a power source. Finally, the existing mounting schemes may not work well with all valves.

BRIEF SUMMARY

It would be desirable to improve the reliability of solenoid valves in general and motorized valves in particular to address the shortcomings noted with regard to existing valves. Robustness can be improved by incorporating structure such as a motor pocket into the housing to better support and secure the motor. A frame may be included in the housing to support and stabilize the gear train. Appropriately placed cam stops also provide for more efficient operation, also enabling the cam member to be displaced over center to prevent unintended changes of state during periods of non-use. The assembly may also include structure for protecting the electrical connections and a mounting bracket to allow for a snap-in connection or a bolted mount to various valve types. The construction of the described embodiments is also rated for a higher operating pressure.

In an exemplary embodiment, a pilot valve includes a housing with a motor pocket, a motor secured in the motor pocket and including a rotating output shaft, and a gear train disposed in the housing and connected to the output shaft. The gear train includes a ring gear with a cam guide. A cam member with a cam pin engages the cam guide and includes a cam shaft. A rocker coupled with the cam shaft is pivotable between a CLOSED position and an OPEN position by operation of the motor according to a position of the ring gear. Cam stops positioned in a path of the cam shaft respectively define the CLOSED and OPEN positions of the rocker.

The motor may be secured in the motor pocket with an adhesive. The pocket may include curved ribs that are shaped corresponding to an exterior surface of the motor.

The pilot valve may also include a frame disposed in the housing and supporting the gear train. The frame may be metal.

The cam stops may be defined by a left-side boss and a right-side boss on the rocker. When the cam member engages the cam stops, the cam member may be rotated past a position where a drive force goes through a rotation axis be such that the cam member rotates over center. In some embodiments, the cam member may be configured to rotate 4° past the position where the drive force goes through the rotation axis. The left- and right-side bosses may be integrally molded with the rocker.

The pilot valve may further include electrical wires disposed in a cable sheath and connecting the motor to a power source, a cable assembly coupled with the housing and including a fitting secured to the housing and receiving the cable sheath, and a wire coil positioned over the cable sheath.

In another exemplary embodiment, a pilot valve includes a housing, a motor secured in the housing and including a rotating output shaft, and a gear train disposed in the housing and connected to the output shaft. The gear train includes a ring gear with a cam guide. A cam member includes a cam pin engaging the cam guide and includes a cam shaft, and a rocker coupled with the cam shaft is pivotable between a CLOSED position and an OPEN position by operation of the motor according to a position of the ring gear. In this embodiment, the rocker includes a left-side boss and a right-side boss that are positioned in a path of the cam member, where the left- and right-side bosses serve as cam stops in the CLOSED and OPEN positions, respectively.

In yet another exemplary embodiment, a pilot valve includes a housing, a motor secured in the housing and including a rotating output shaft, and a rocker disposed in the housing and coupled with the motor via a cam mechanism. The rocker is pivotable between a CLOSED position and an OPEN position by operation of the motor. The rocker includes the left-side boss and the right-side boss that are positioned in a path of the cam mechanism, where the left- and right-side bosses serve as cam stops in the CLOSED and OPEN positions, respectively.

BRIEF DESCRIPTION OF THE DRAWINGS

These and other aspects and advantages will be described in detail with reference to the accompanying drawings, in which.

DETAILED DESCRIPTION

Figure 1:
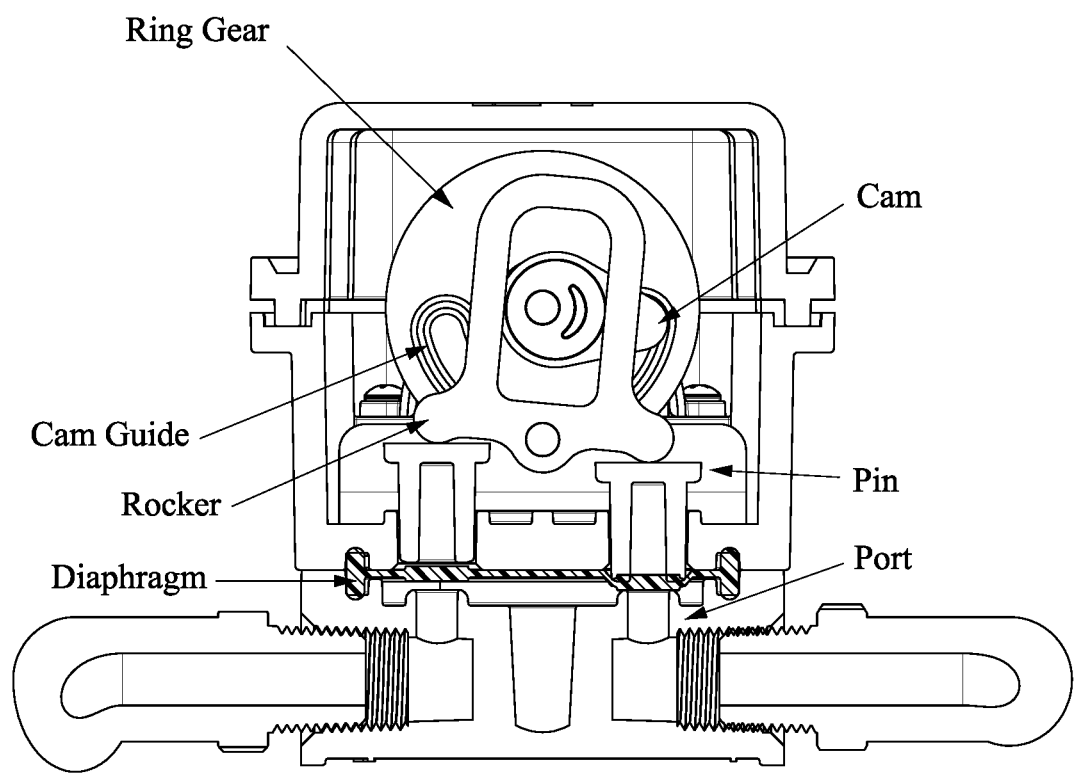
FIG. 1 shows a typical motorized pilot valve internal mechanism.
Figure 2:
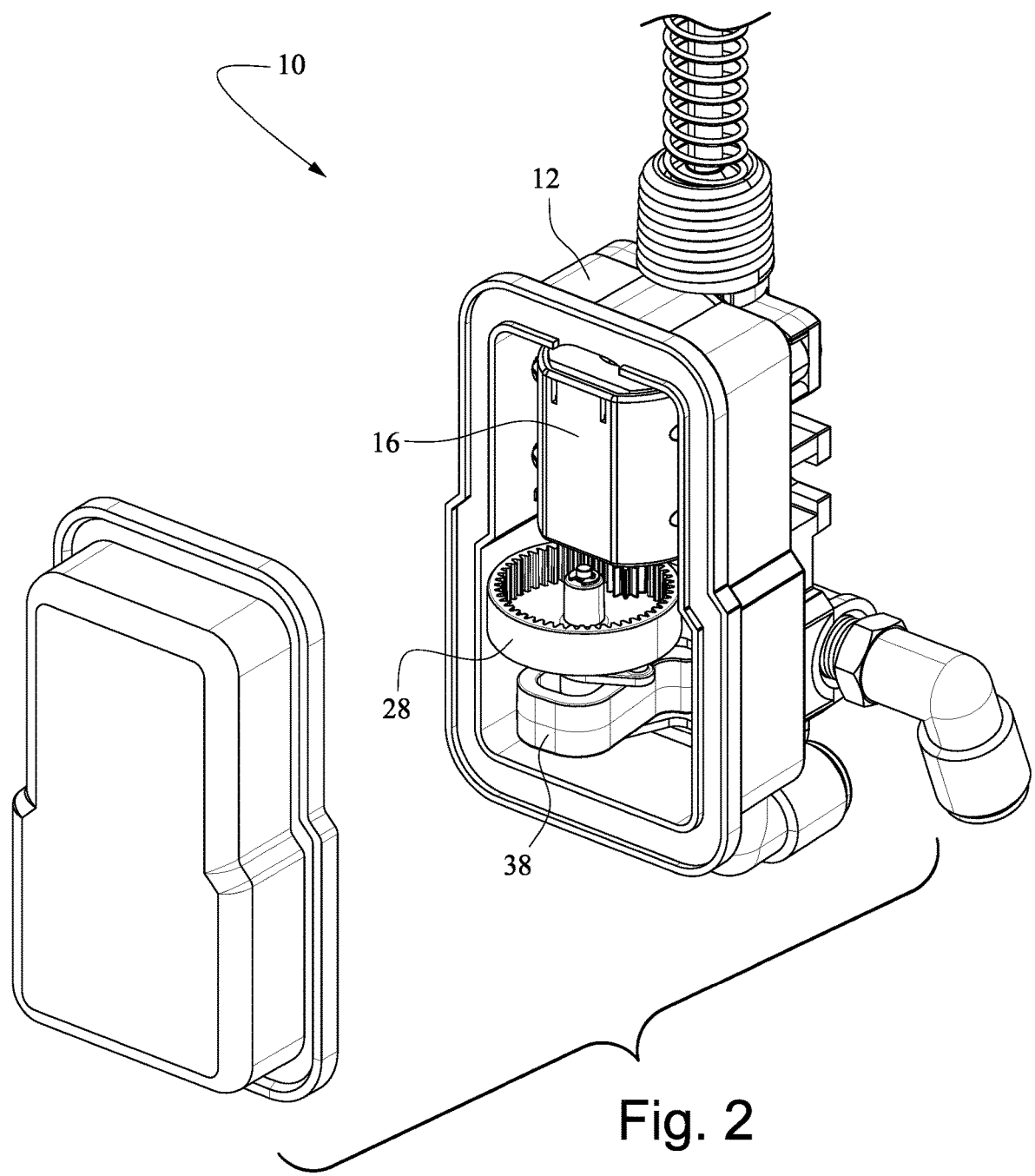
FIG. 2 is a perspective view of the mechanism according to the described embodiments secured in a housing.
Figure 3:
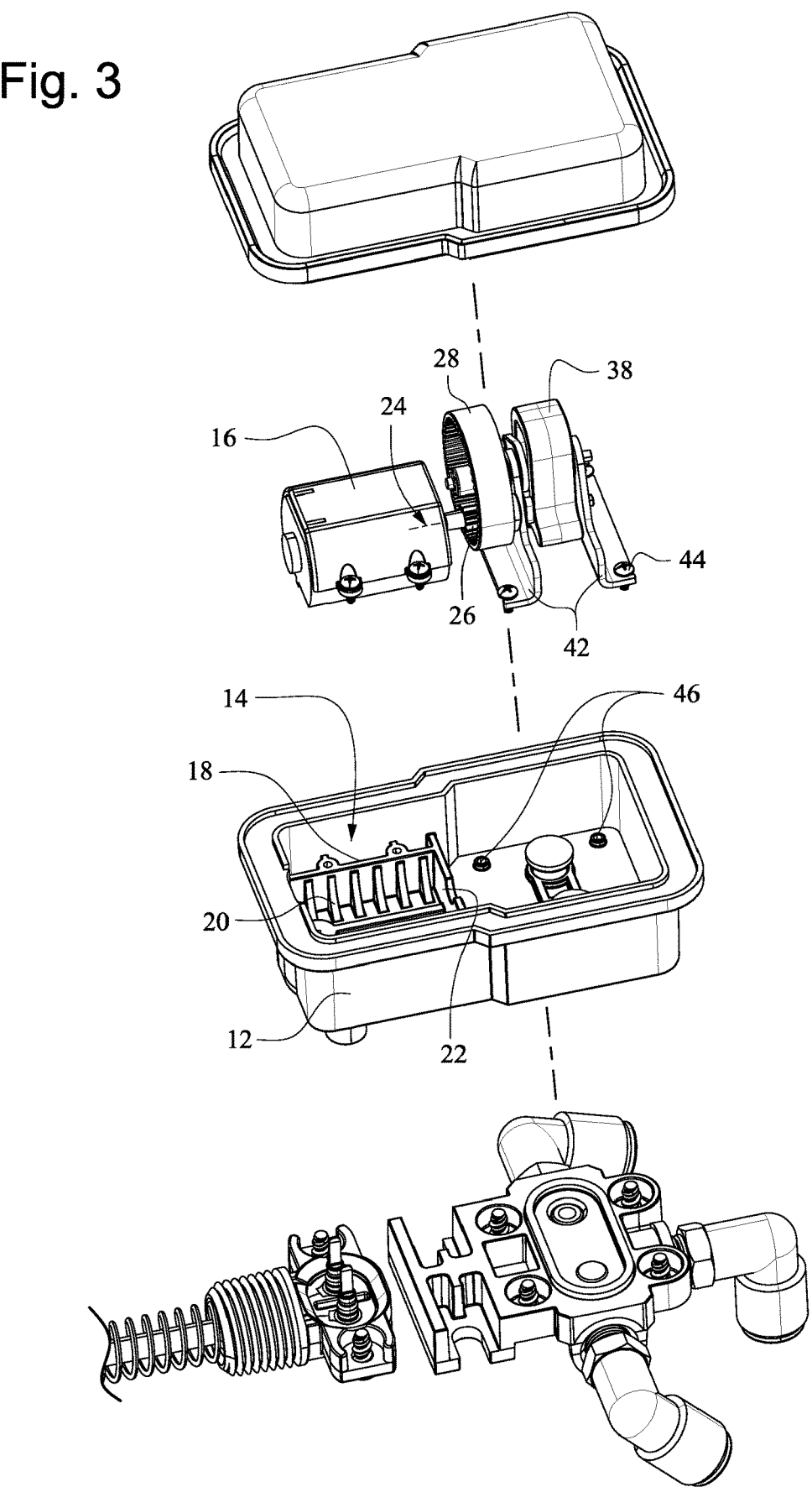
FIG. 3 is an exploded view with the mechanism separated from the housing.

With reference to FIGS. 2 and 3, a pilot valve 10 includes a housing 12 with a motor pocket 14 in which a motor 16 is secured. The motor pocket 14 is preferably molded integral with the housing 12 and includes a sidewall 18, curved ribs 20 that are shaped corresponding to an exterior surface of the motor 16, and an end wall 22. As shown, the end wall 22 includes a notch through which an output shaft 24 of the motor 16 is extended. The motor 16 may be secured in the motor pocket 14 with an adhesive. The pocket 14 helps to restrain the motor 16 from shifting and putting a load on the structure. As an alternative to the adhesive or as additional restraining structure, the motor 16 can be secured by a hold down clamp with a rubber pad or the like or solely by use of the glue such as an epoxy or other appropriate adhesive.

The motor output shaft 24 is coupled with a gear train that may include a pinion gear 26 engaging a ring gear 28. The ring gear 28 is provided with a cam guide 30 on an opposite side.

Figure 4:
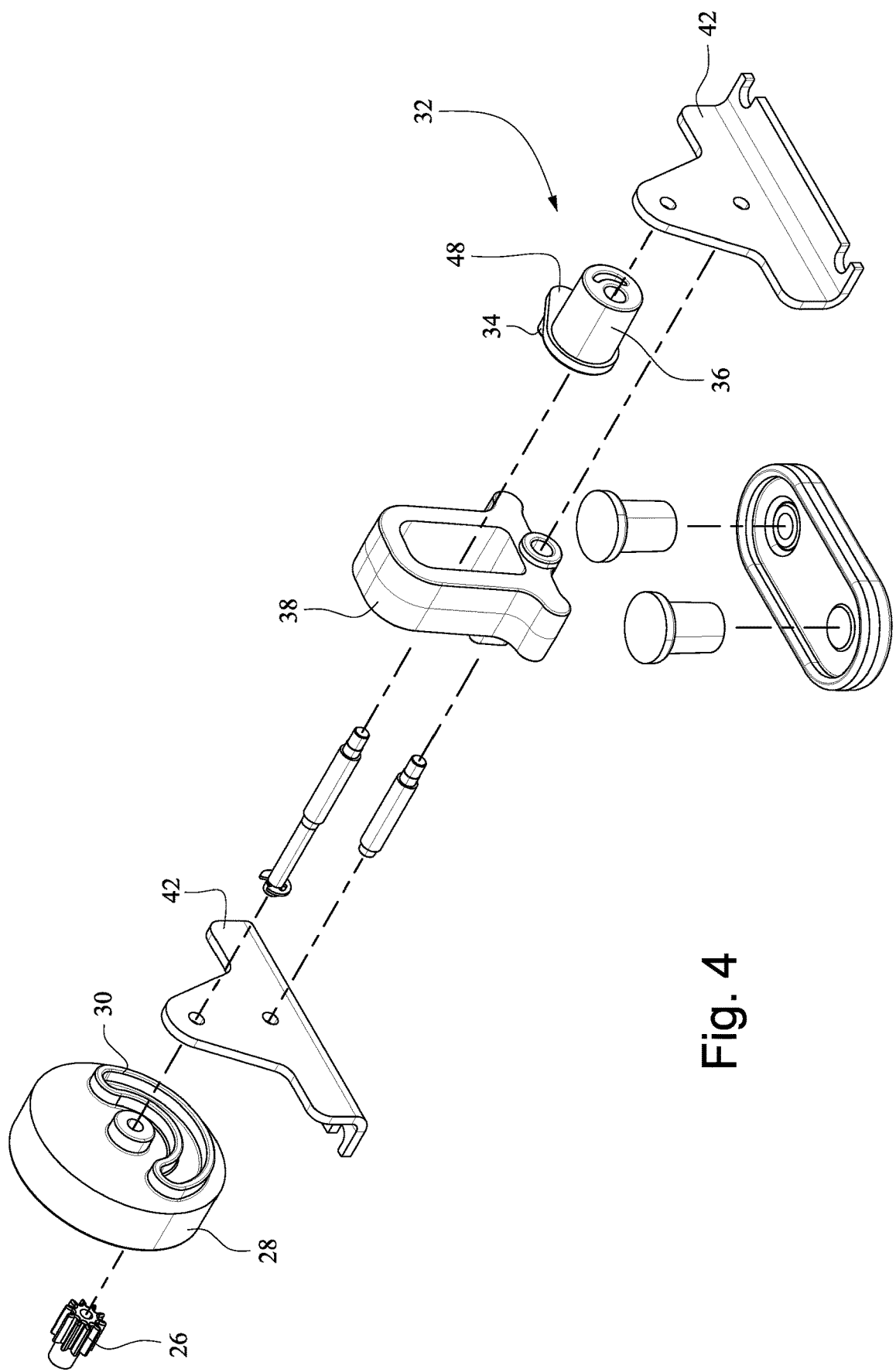
FIG. 4 is an exploded view showing the cam guide on the ring gear and the cam member.

With reference to FIG. 4, a cam member 32 includes a cam pin 34 engaging the cam guide 30 and a cam shaft 36. A rocker 38 is coupled with the cam shaft 36 and is pivotable on a pivot 40 between a CLOSED position and an OPEN position by operation of the motor 16 according to a position of the cam shaft 36, which is displaced according to a position of the ring gear 28. That is, as the ring gear 28 is rotated by operation of the motor 16 to rotate the pinion gear 26, the cam guide 30 on the ring gear 28 guides the cam pin 34, thus rotating the cam member 32 and thereby displacing the cam shaft 36 to the left or the right depending on a rotation direction of the motor 16. The cam shaft 36 pushes on the side of the rocker 38 to thereby displace the rocker 38 between the CLOSED and OPEN positions.

The gear train may be supported on a frame 42 such as a metal frame disposed in the housing. The frame 42 may be secured in the housing by suitable connecting members 44 such as screws or the like engaging receiving holes 46 in the housing 12.

Figure 5:
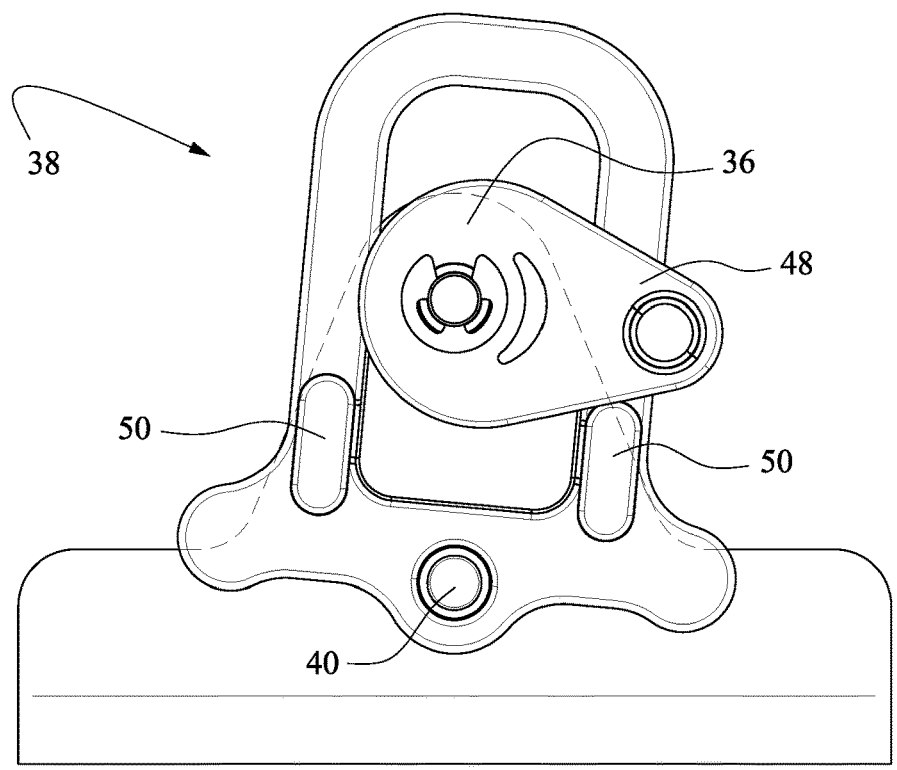
FIG. 5 shows the cam arm stopped by a boss on the rocker.

With reference to FIGS. 4 and 5, the cam member 32 may include a cam arm 48 as part of the cam shaft 36. The rocker 38 may be provided with left- and right-side bosses 50 that are positioned in a path of the cam member 32. The left- and right-side bosses 50 serve as cam stops in the CLOSED and OPEN positions. In alternative constructions, rotation of the cam member 32 may be stopped by the rocker 38 engaging the pin that is pressed into the diaphragm. It was discovered, however, that this construction allowed the cam member to extend too far beyond center. When this happened, the motor did not have sufficient power to rotate the cam member back from the engaged position. A motor with higher torque could be used, but is undesirable as the drive circuitry may not support the additional current. Yet another alternative may be to provide cross pins secured to the frame 42 that serve as cam stops for the cam member. This is a viable alternative, but adds to the cost in material and assembly time. The use of the bosses 50 is thus preferable to prevent further rotation of the cam member and rocker in the CLOSED and OPEN positions. With the preferred construction, the cam member does not jam, and the motor has sufficient torque to move the rocker in the opposite directions between the cam stops. The left- and right-side bosses 50 may be integrally molded with the rocker 38, thereby minimizing cost of material without affecting assembly time.

With existing devices, after a period of nonuse such as over winter or the like, the valve may be deflected or may drift into a neutral position that is neither in the CLOSED nor OPEN position. In order to restart the valve, the valve has to be cycled for displacement into a known state. It has been discovered that ice formation or vibration may jog the mechanism. Since the existing devices move to a position where the drive force goes through the center of the point of rotation, it does not take much force to move it off this point.

Figure 6:
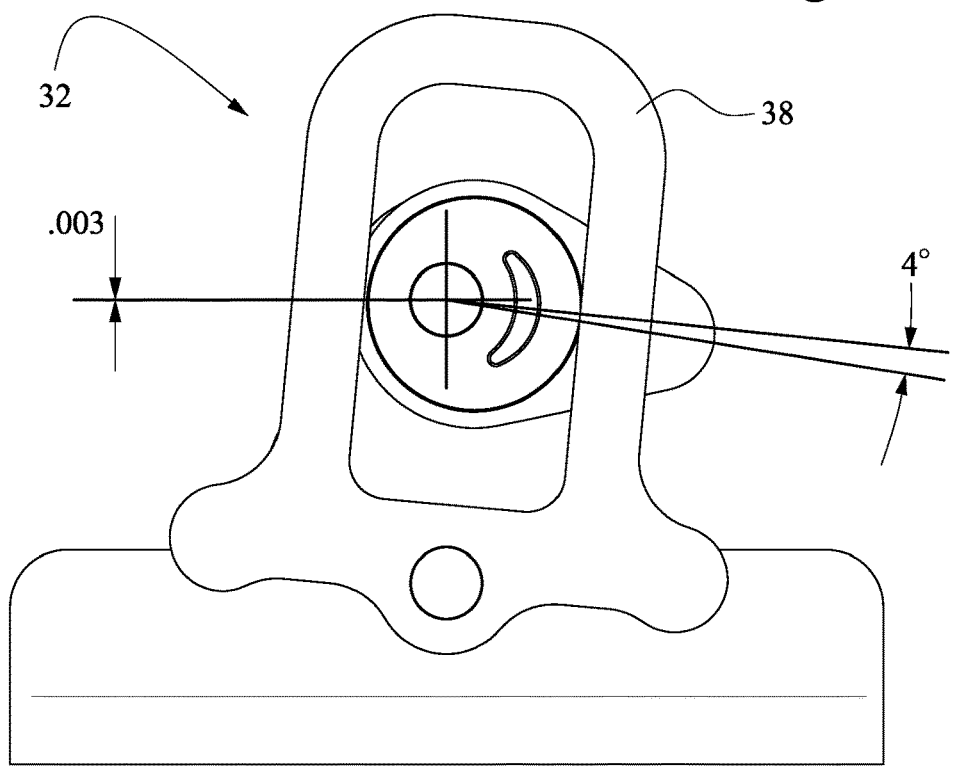
FIG. 6 shows the cam/rocker assembly in an over center position.

With reference to FIG. 6, in some embodiments, the cam member 32 is configured to rotate past a position where the drive force goes through a rotation axis such that the cam member rotates over center. In an exemplary application, the cam member may rotate 4° past the point where the drive force goes through the point of rotation. The drive force then goes through a point 0.003 inches below the center of rotation. The cam member 32 thus rotates over center, and any movement or shock will tend to reinforce the locking of the cam member 32 and rocker 38 rather than loosen them. The right- and left-side bosses 50 are thus positioned such that the cam member 32 still rotates into the over center position so the water pressure on the diaphragm cannot push the pin and rocker out of this position.

Figure 7:
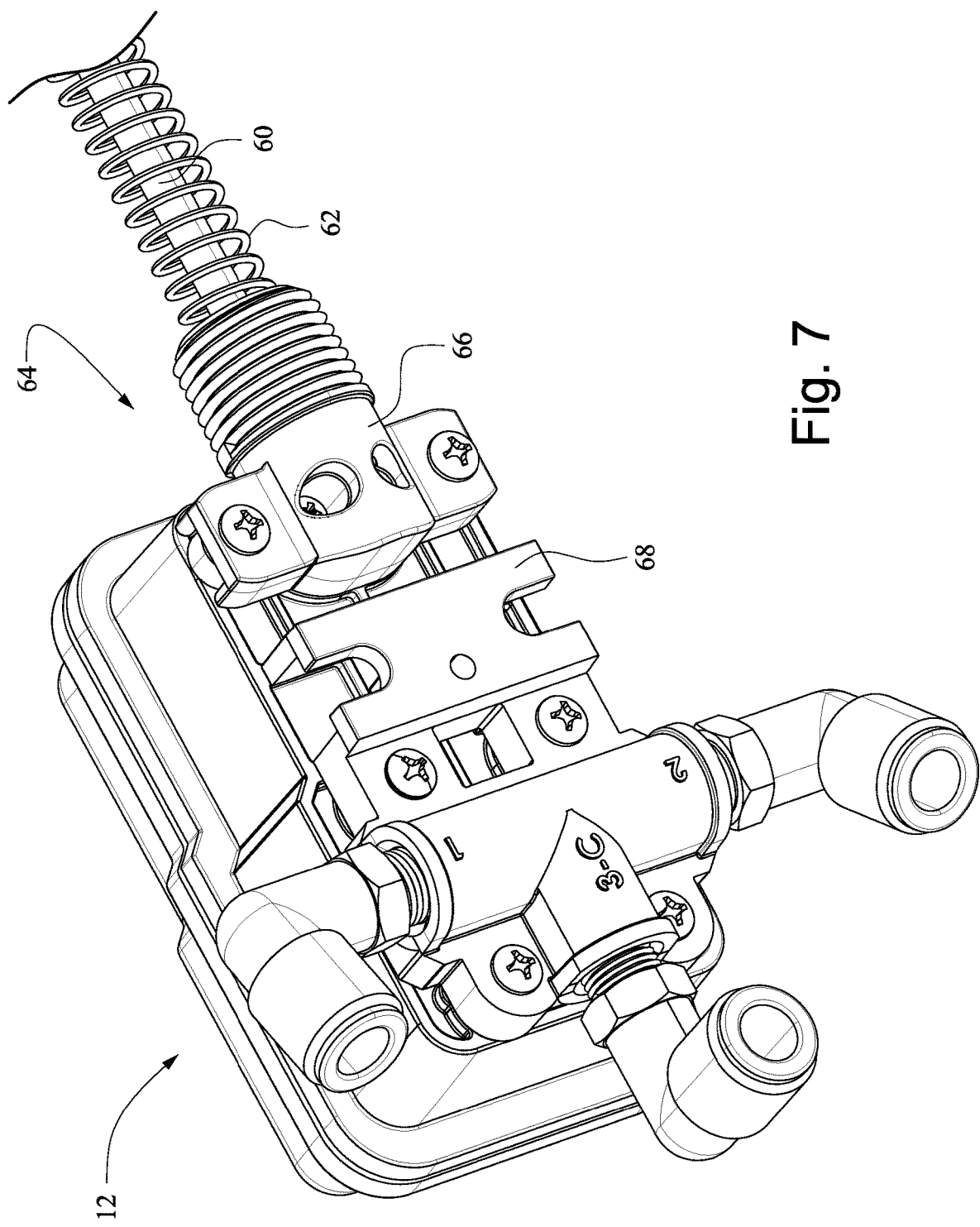
FIG. 7 is a rear perspective view showing the electrical cord attachment and a mounting bracket.

With reference to FIG. 7, in order to protect the electrical wires that connect the motor 16 to a power source, the electrical wires are disposed in a cable sheath 60. A wire coil 62 may be positioned over the cable sheath. A cable assembly 64 is coupled with the housing 12 and includes a fitting 66 secured to the housing and receiving the cable sheath 60. In some embodiments, the cable assembly is screwed to the housing 12. The wire coil serves to protect the cable sheath 60 from damage in the field or by animals or the like. Since the cable assembly can be readily detached, in the event of cable damage, the whole assembly can be easily replaced.

The housing 12 may also be provided with a customized mounting bracket 68 to allow for a snap-in connection or a bolted mount to various valve types.

Existing valves have been rated for 150 psig (10 bar) operating pressure. Testing has shown that this is a maximum as the valve may leak at or slightly above this pressure. Additionally, existing valves may fail after a year in service and will no longer hold this pressure. The rocker in the existing design incorporates a pair of leaf springs that enable manual operation of the valve. A problem has been discovered, however, that the pressure force can overcome the force from the springs, thereby allowing the pressure to lift the diaphragm and enable water to leak past the seal. The valve according to the described embodiments is not intended to provide for manual operation, and the leaf springs are not required. The construction has been tested to withstand at least 250 psig of pressure, which is the maximum pressure generated by the test bench. In some embodiments, the valve is rated 175 psig operating pressure and tested to 200 psig.

The pilot valve according to the described embodiments is constructed to overcome shortcomings in existing valves. The more robust structure prevents premature failure to extend the useful life of the device. An increased pressure rating provides for expanded applications, and the construction prevents unintended changes of state during periods of nonuse. Moreover, the electrical connection in the system of the described embodiments is more secure and easily replaced if needed. The resulting construction provides for improved reliability and operation.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A pilot valve comprising:
a housing including a motor pocket;
a motor secured in the motor pocket and including a rotating output shaft;
a gear train disposed in the housing and connected to the output shaft, the gear train including a ring gear with a cam guide;
a cam member including a cam pin engaging the cam guide and a cam shaft;
a rocker coupled with the cam shaft and pivotable between a CLOSED position and an OPEN position by operation of the motor according to a position of the ring gear; and
cam stops positioned in a path of the cam shaft, the cam stops respectively defining the CLOSED and OPEN positions of the rocker,
wherein the cam stops comprise a left-side boss and a right-side boss on the rocker.

2. A pilot valve according to claim 1, wherein the motor is secured in the motor pocket with an adhesive.

3. A pilot valve according to claim 1, wherein the pocket includes curved ribs that are shaped corresponding to an exterior surface of the motor.

4. A pilot valve according to claim 1, further comprising a frame disposed in the housing and supporting the gear train.

5. A pilot valve according to claim 4, wherein the frame is metal.

6. A pilot valve according to claim 1, wherein when the cam member engages the cam stops, the cam member is rotated past a position where a drive force goes through a rotation axis such that the cam member rotates over center.

7. A pilot valve according to claim 6, wherein the cam member is configured to rotate 4° past the position where the drive force goes through the rotation axis.

8. A pilot valve according to claim 7, wherein the left- and right-side bosses are integrally molded with the rocker.

9. A pilot valve according to claim 1, wherein when the cam member displaces the rocker to the CLOSED position or the OPEN position, the cam member is rotated past a position where a drive force goes through a rotation axis such that the cam member rotates over center.

10. A pilot valve according to claim 1, further comprising:
electrical wires connecting the motor to a power source, the electrical wires being disposed in a cable sheath;
a cable assembly coupled with the housing, the cable assembly including a fitting secured to the housing and receiving the cable sheath; and
a wire coil positioned over the cable sheath.

11. A pilot valve comprising:
a housing;
a motor secured in the housing and including a rotating output shaft;
a gear train disposed in the housing and connected to the output shaft, the gear train including a ring gear with a cam guide;
a cam member including a cam pin engaging the cam guide and a cam shaft; and
a rocker coupled with the cam shaft and pivotable between a CLOSED position and an OPEN position by operation of the motor according to a position of the ring gear, wherein the rocker comprises a left-side boss and a right-side boss that are positioned in a path of the cam member, the left- and right-side bosses serving as cam stops in the CLOSED and OPEN positions, respectively.

12. A pilot valve according to claim 11, wherein the cam member comprises a cam arm forming part of the cam shaft, the cam arm engaging the left- and right-side bosses in the CLOSED and OPEN positions, respectively.

13. A pilot valve according to claim 12, wherein when the cam member engages the cam stops, the cam arm is rotated past a position where a drive force goes through a rotation axis such that the cam member rotates over center.

14. A pilot valve according to claim 11, wherein the housing comprises a motor pocket that is sized and shaped to receive and support the motor, and wherein the motor is positioned in the motor pocket.

15. A pilot valve according to claim 14, wherein the motor is secured in the motor pocket with an adhesive.

16. A pilot valve according to claim 14, wherein the pocket includes curved ribs that are shaped corresponding to an exterior surface of the motor.

17. A pilot valve comprising:
a housing;
a motor secured in the housing and including a rotating output shaft; and
a rocker disposed in the housing and coupled with the motor via a cam mechanism, the rocker being pivotable between a CLOSED position and an OPEN position by operation of the motor, wherein the rocker comprises a left-side boss and a right-side boss that are positioned in a path of the cam mechanism, the left- and right-side bosses serving as cam stops in the CLOSED and OPEN positions, respectively.

18. A pilot valve according to claim 17, wherein the housing comprises a motor pocket that is sized and shaped to receive and support the motor, and wherein the motor is positioned in the motor pocket.

19. A pilot valve according to claim 18, wherein the motor is secured in the motor pocket with an adhesive.

* * * * *